(12) United States Patent
Lee et al.

(10) Patent No.: US 7,976,993 B2
(45) Date of Patent: Jul. 12, 2011

(54) FUEL COMPOSITION FOR FUEL CELL AND FUEL CELL USING THE SAME

(75) Inventors: Seol-ah Lee, Yongin-si (KR); Hyuk Chang, Yongin-si (KR); Chan-ho Pak, Yongin-si (KR); Dae-jong Yoo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1251 days.

(21) Appl. No.: 11/635,031

(22) Filed: Dec. 7, 2006

(65) Prior Publication Data

US 2007/0148515 A1    Jun. 28, 2007

(30) Foreign Application Priority Data

Dec. 28, 2005  (KR) .................. 10-2005-0131884

(51) Int. Cl.
*H01M 8/06* (2006.01)
(52) U.S. Cl. .................. 429/426; 429/408; 429/479
(58) Field of Classification Search .................. None
See application file for complete search history.

(56) References Cited

U.S. PATENT DOCUMENTS

| | | | | |
|---|---|---|---|---|
| 5,804,325 A | * | 9/1998 | Yepez | .............. 429/13 |
| 6,773,470 B2 | | 8/2004 | Finkelshtain et al. | |
| 2003/0144450 A1 | * | 7/2003 | Jacob et al. | .............. 528/10 |
| 2004/0093791 A1 | | 5/2004 | Finkelshtain et al. | |
| 2004/0247992 A1 | * | 12/2004 | Kabumoto et al. | .............. 429/44 |

FOREIGN PATENT DOCUMENTS

| | | |
|---|---|---|
| CN | 1540790 | 10/2004 |
| JP | 2001-250573 | 9/2001 |
| JP | 2002-280045 | 9/2002 |
| JP | 2004-319467 | 11/2004 |
| JP | 2004-349029 | 12/2004 |

OTHER PUBLICATIONS

Certificate of Patent No. ZL2006101712742 issued in the corresponding Chinese application by the Chinese Intellectual Property Office on Jan. 6, 2010 (including the Chinese application CN 100578848C).

Office Action issued by the Japanese Patent Office on Jun. 1, 2010.

\* cited by examiner

*Primary Examiner* — Dah-Wei D Yuan
*Assistant Examiner* — Maria J Laios
(74) *Attorney, Agent, or Firm* — Lee & Morse, P.C.

(57) ABSTRACT

Provided is a fuel composition for a fuel cell including a first fuel which generates protons and electrons, and hydrogen gas. Also, provided is a fuel cell using the fuel composition. Using the fuel composition for a fuel cell, catalyst activation can be increased. Also, a fuel cell having high efficiency and excellent performance can be prepared using the fuel composition.

16 Claims, 3 Drawing Sheets

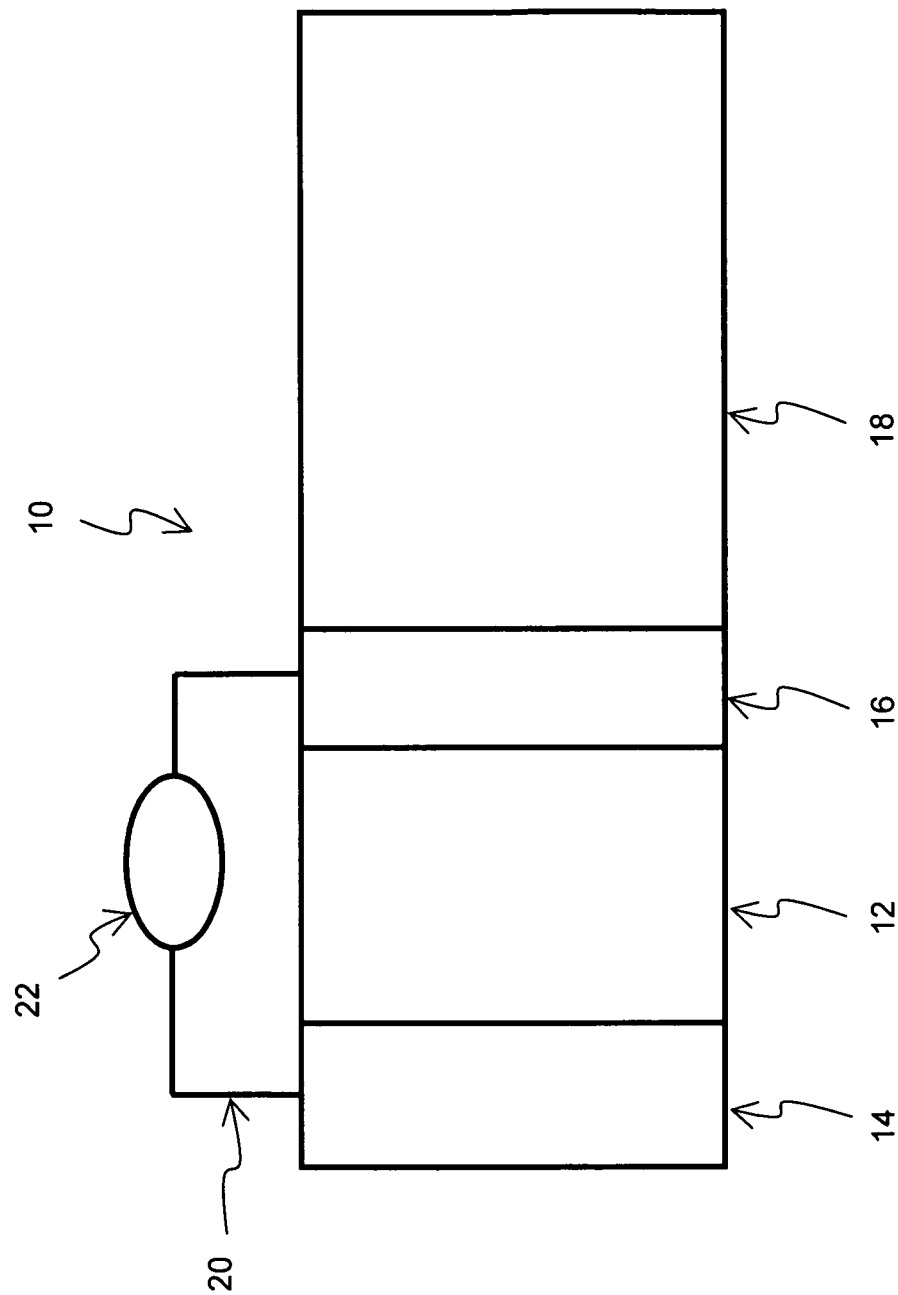

FUEL COMPOSITION FOR FUEL CELL AND FUEL CELL USING THE SAME

CROSS-REFERENCE TO RELATED APPLICATIONS

This application claims the benefit of Korean Application No. 2005-131884, filed on Dec. 28, 2005, in the Korean Intellectual Property Office, the disclosure of which is incorporated herein by reference.

BACKGROUND OF THE INVENTION

1. Field of the Invention

Aspects of the present invention relate to a fuel composition for a fuel cell as well as a fuel cell using the same, and more particularly, to a fuel composition which increases catalyst activity to maximize the performance of a fuel cell as well as a fuel cell having excellent performance by using the fuel composition.

2. Description of the Related Art

In a direct methanol fuel cell, electrons, protons, and carbon monoxide are generated from methanol as shown in Reaction Formula 1 below through adsorption of the methanol onto an anode catalyst.

$CH_3OH \rightarrow CO + 4H^+ + 4e-$            <Reaction Formula 1>

Carbon monoxide generated in the above reaction adheres to the anode catalyst, thereby decreasing the active area where additional oxidation occurs in the anode catalyst. Hence, power output is decreased. To improve power output, an anode catalyst which accelerates the additional oxidation of carbon monoxide (CO), a mixture of methanol and an aqueous liquid electrolyte as a fuel can be used. When a catalyst or the mixture as a fuel is used, methanol reacts with water in the anode to generate carbon dioxide and hydrogen ions, as shown in Reaction Formula 2 below.

$CH_3OH + H_2O \rightarrow 6H^+ + CO_2 + 6e-$            <Reaction Formula 2>

A solid polymer electrolyte membrane is used as an electrolyte membrane in a direct methanol fuel cell. Generally, a perfluorinated polymer, such as commercially available NAFION®, is used as the solid polymer electrolyte membrane However, methanol diffuses through a solid polymer electrolyte membrane. Thus, much methanol evaporates without being used to generate a current. Also, when methanol penetrates the solid polymer electrolyte membrane and contacts a cathode catalyst, the methanol is directly oxidized in the cathode, generating heat instead of a current. Thus, only a small current can be generated. In addition, protons generated at an anode catalyst layer pass through the solid polymer electrolyte membrane, and hence, the protons cannot smoothly move to the cathode catalyst layer, further reducing the generation of current.

In a fuel cell using methanol or sodium borohydride ($NaBH_4$) as fuel, methanol or $NaBH_4$ is used to produce electrons and hydroxyl ions ($OH^-$) both of which pass through an electrolyte membrane to increase the current. In such a fuel cell, a variety of chemicals such as sodium thiosulfate ($Na_2S_2O_3$), disodium phosphonate ($Na_2HPO_3$), and sodium phosphinate ($Na_2HPO_2$) can be used to smoothly generate $OH^-$. (U.S. Pat. No. 6,773,470).

However, the performance of a fuel cell prepared using such a mixture of chemicals is still not satisfactory.

SUMMARY OF THE INVENTION

An aspect of the present invention provides a fuel composition which can increase catalyst activity to improve the performance of a fuel cell as well as a method of preparing the fuel composition.

An aspect of the present invention also provides a fuel cell having excellent efficiency through addition of fuel additives or through changing the fuel composition.

Another aspect of the present invention, provides a fuel composition for a fuel cell including: a first fuel which generates protons and electrons; and hydrogen gas.

Another aspect of the present invention, provides a method of preparing the fuel composition described above, the method including bubbling the hydrogen gas into a first fuel where the bubbled hydrogen assists in generating protons and electrons.

Another aspect of the present invention, provides a fuel cell including: a cathode; an anode; a solid polymer electrolyte membrane disposed between the cathode and the anode; and the above fuel composition.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a diagram of a fuel cell suitable for use with the above fuel composition or method.

DETAILED DESCRIPTION OF THE EMBODIMENTS

Figure 1:
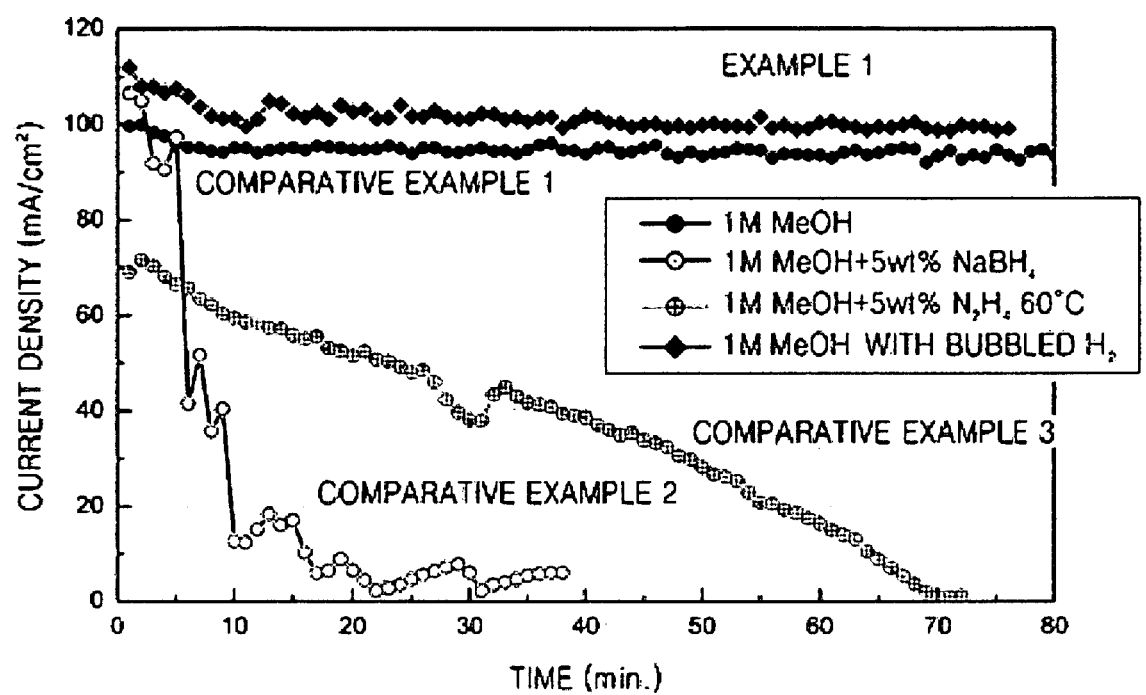
FIG. 1 is a graph of current density against time for fuel cells prepared according to Example 1 according to an embodiment of the present invention and Comparative Examples 1 through 3.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A fuel composition according to an embodiment of the present invention includes a first fuel which generates protons and electrons, and hydrogen gas.

The amount of hydrogen gas may be in the range of 0.01 to 30 parts per hundred by volume (volume percent or vol. %). When the amount of the hydrogen gas is less than 0.01 volume percent, the hydrogen gas has a negligible effect on the fuel composition. Also, adding hydrogen gas exceeding 30 volume percent to a methanol aqueous solution is technically difficult. Further, when the amount of the hydrogen gas is greater than 30 volume percent, a fuel cell having hydrogen as a main fuel has been prepared instead of a direct methanol fuel cell.

The term volume percent used in aspects of the present invention is a term to express relative volume. For example, when the amount of A is 10 parts by volume in 100 parts by volume of B, the amount of A is 1/10 the volume of B or 10 volume percent.

The first fuel generates protons and electrons, and includes at least one aqueous solution selected from the group consisting of C1-C10 alkyl alcohols and C1-C10 alkyl acids, and preferably, selected from the group consisting of methanol, ethanol, and formic acid. Here, the concentration of the aqueous solution may be in the range of 0.01 to 17 M. When the concentration of the aqueous solution is less than 0.01 M, the quantity of electrons generated is small. When the concentration of the aqueous solution is greater than 17 M, carbon monoxide poisoning of an anode catalyst is high and the amount of methanol passing through a polymer electrolyte membrane is high, which deteriorates the performance of a fuel cell.

An operating principle when the fuel composition containing the hydrogen gas according to the above embodiment is used will now be described.

A reaction of methanol fuel in an anode is as shown in Reaction Formula 2 described above. Methanol reacts with water, generating 6 electrons and 6 protons. When the hydrogen gas used in an embodiment of the present invention is added, 8 electrons and 8 protons are prepared as shown in Reaction Formula 3 below. Thus, an improvement in performance is possible by increasing current density.

Some of the hydrogen can be used to generate electrons as shown in Reaction Formula 3 and some of the hydrogen can be used to reduce an oxidized metal catalyst as shown in Reaction Formula 4. During methanol oxidation, a hydroxyl group is adsorbed on the surface of platinum (Pt) and ruthenium (Ru) particles, or the Pt and Ru particles are present as an oxide thereof on the surface of the Pt and Ru particles. In this case, a reaction rate is decreased or some Pt and Ru cannot function as a catalyst. The added hydrogen gas reduces oxides on the surface of the catalyst metal to increase current density and improve performance.

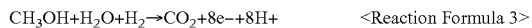
CH$_3$OH+H$_2$O+H$_2$→CO$_2$+8e−+8H+     <Reaction Formula 3>

Pt—OH+Ru—OH+H$_2$→Pt+Ru+2H$_2$O     <Reaction Formula 4>

A method of preparing a fuel composition for a fuel cell according to an embodiment of the present invention will now be described.

First, hydrogen gas is bubbled at a predeternmined rate into a first fuel to saturate hydrogen gas in the first fuel. The amount of the hydrogen gas saturated in the first fuel is varied according to the bubbling temperature, bubbling rate and pressure of the hydrogen gas. Methods of supplying the hydrogen gas to the first fuel are not limited to bubbling, and other conventional methods can be used.

The bubbling temperature of the hydrogen gas may be in the range of −50 to 80° C., and the bubbling speed may be in the range of 1 mL/min to 20 L/min. When the bubbling temperature is less than −50° C., the methanol freezes, and thus bubbling is not possible. When the bubbling temperature is greater than 80° C., the methanol evaporates. Also, when the bubbling rate is less than 1 mL/min, the preparation [reaction] time is increased. When the bubbling speed is greater than 20 L/min, hydrogen gas is lost.

In addition, the pressure of the hydrogen gas during the bubbling may be in the range of 0.1 to 20 atm. When the bubbling pressure is less than 0.1 atm, the absolute amount of the bubbled hydrogen gas in the first fuel is small. When the bubbling pressure is greater than 20 atm, hydrogen gas is lost.

Hereinafter, a fuel cell according to an embodiment of the present invention will be described in detail.

A fuel cell can be formed by disposing an electrode having a catalyst layer on both sides of a polymer electrolyte membrane and binding the electrode and the polymer electrolyte membrane under high temperature and pressure. Alternatively, a fuel cell can be formed by coating a catalyst metal generating an electrochemical catalyst reaction on a polymer electrolyte membrane to form a catalyst layer, and binding a fuel diffusion layer to the catalyst layer. A fuel cell can also be formed by forming a catalyst layer directly on a fuel diffusion layer and binding the diffusion layer to a polymer electrolyte membrane under high temperature and pressure.

The catalyst may be formed of platinum only or an alloy or a mixture of platinum and at least one metal selected from the group consisting of gold, palladium, rhodium, iridium, ruthenium, tin, molybdenum, tungsten, iron, vanadium, copper, nickel, osmium, and chromium.

According to an embodiment of the present invention, the fuel cell is a direct methanol fuel cell. FIG. 3 is a schematic diagram of such a fuel cell 10. Chamber 18 is the chamber containing the fuel composition of the present invention. The solid polymer electrode membrane, 12, such as the NAFION® ionomer discussed above and in the examples below serves as the electrolyte of the fuel cell 10. The cathode layer 14 may be prepared from a mixture of a cathodic (electron donating) catalyst and an additional portion of the solid polymer electrode material, or it can be prepared by coating the cathodic catalyst on the solid polymer electrode membrane 12 along with a fuel diffusion layer. In either case, the cathode catalyst 14 must be bonded to the solid polymer electrode membrane under high temperature and pressure. The anode layer 16 may be prepared from a mixture of an anodic (electron accepting) catalyst and an additional portion of the solid polymer electrode material, or it can be prepared by coating the anodic catalyst on the solid polymer electrode membrane 12 along with a fuel diffusion layer. In either case, the anode catalyst 16 must be bonded to the solid polymer electrode membrane under high temperature and pressure. When the fuel cell 10 is in use, electrons flow from the cathode layer 14 along conductor 20 through load 22 and ultimately back to the anode layer 16.

Aspects of the present invention will now be described in further detail with reference to the following examples. These examples are for illustrative purposes only, and are not intended to limit the scope of the present invention.

EXAMPLE 1

First, hydrogen gas was bubbled into 1 M methanol as a first fuel at 20° C. to prepare a fuel composition. Here, the amount of the hydrogen gas was 0.153 volume percent of the fuel composition.

The catalyst, platinum on activated carbon (Pt/C, 60%/40% by weight) was dispersed in a mixture of ultra pure distilled water, ethylene glycol and a 20 wt % NAFION® ionomer solution (manufactured by DuPont) to prepare a slurry. The slurry was coated on a polymer film to form a cathode catalyst layer. The loading amount of Pt in the cathode catalyst layer was 2 mg/cm$^2$.

An anode catalyst layer was prepared in the same manner as the cathode catalyst layer, except that 1:1 platinum and ruthenium on carbon black (PtRu black) was used instead of Pt/C. The loading amount of PtRu in the anode catalyst layer was 6 mg/cm$^2$. A unit cell was prepared by transferring the anode and cathode catalyst layers on respective sides of NAFION® 115 as an electrolyte film and then binding an anode diffusion layer and a cathode diffusion layer to the anode and cathode catalyst layers, respectively.

A unit cell test was performed using the fuel composition as an anode fuel and air as a cathode fuel. The current density was measured while maintaining the voltage at 0.4 V while the operating temperature was 50° C.

EXAMPLE 2

A unit cell was prepared in the same manner as in Example 1, except that the loading amount of the catalyst in the cathode catalyst layer was 3 mg/cm$^2$, and the loading amount of the catalyst in the anode catalyst layer was 6 mg/cm$^2$.

EXAMPLE 3

A unit cell was prepared in the same manner as in Example 1, except that hydrogen gas was bubbled into 1 M methanol at 50° C.

EXAMPLE 4

A unit cell was prepared in the same manner as in Example 1, except that hydrogen gas was bubbled into 1 M methanol at 3° C.

COMPARATIVE EXAMPLE 1

A unit cell was prepared in the same manner as in Example 1, except that 1 M methanol was used as a fuel (composition) instead of the mixture of hydrogen gas and 1 M methanol. A unit cell test was performed on the unit cell.

COMPARATIVE EXAMPLE 2

A unit cell was prepared in the same manner as in Example 1, except that a mixture of 1 M methanol and 5 wt % NaBH$_4$ was used as a fuel (composition) instead of the mixture of hydrogen gas and 1 M methanol. A unit cell test was performed on the unit cell.

COMPARATIVE EXAMPLE 3

A unit cell was prepared in the same manner as in Example 1, except that a mixture of 1 M methanol and 5 wt % NaBH$_4$ was used as a fuel (composition) instead of the mixture of hydrogen gas and 1 M methanol. Also, a unit cell test was performed in the same manner as in Example 1, except that the temperature was 60° C.

COMPARATIVE EXAMPLE 4

A unit cell was prepared in the same manner as in Example 2, except that 1 M methanol was used as a fuel (composition) instead of the mixture of hydrogen gas and 1 M methanol. A unit cell test was performed on the unit cell.

The amount of dissolved hydrogen in the fuel compositions obtained from Examples 1, 3 and 4 and Comparative Example 1 was measured using a low vacuum gas analyzing system. The results are shown in Table 1 below. The low vacuum gas analyzing system measures the amount of dissolved hydrogen by freezing 1 cc of the fuel composition in liquid nitrogen. When the fuel composition freezes, water and methanol freeze and the hydrogen exhausts as a gas. The amount of hydrogen gas exhausted is measured.

TABLE 1

| Examples | Amount of H$_2$ ($10^{-3}$ ml) per 1 cc of fuel composition |
|---|---|
| 1M methanol (MeOH) (Comparative Example 1) | 0 |
| 1M MeOH (20° C.) with bubbled H$_2$ (Example 1) | 1.53 |
| 1M MeOH (50° C.) with bubbled H$_2$ (Example 3) | 1.01 |
| 1M MeOH (3° C.) with bubbled H$_2$ (Example 4) | 7.86 |

Referring to Table 1, as the bubbling temperature decreased, the amount of dissolved hydrogen increased. Also, even at 50° C., which is the temperature at which the fuel cell system operates, hydrogen gas remained in the fuel composition.

FIG. 1 is a graph of current density against time for the fuel cells prepared according to Example 1 and Comparative Examples 1 through 3. The performance of the fuel cells was measured at 50° C. while adding a mixture of 1 M methanol and each fuel additive with dry air.

Referring to FIG. 1, the fuel cell of Example 1 had a higher current density than the fuel cells of Comparative Examples 1 through 3. In the case of the fuel cell of Comparative Example 2, when NaBH$_4$ as a proton conductor is added to the fuel composition, NaBH$_4$ acts as a strong alkali to reduce proton sites and the oxidation product, borate ion (BO$_2^-$) blocks active sites of the catalyst. Accordingly, the performance of the fuel cell deteriorates. Although the results obtained from the fuel cells of Examples 2 through 4 are not shown in FIG. 1, the results were similar to the results obtained from the fuel cell of Example 1.

Figure 2:
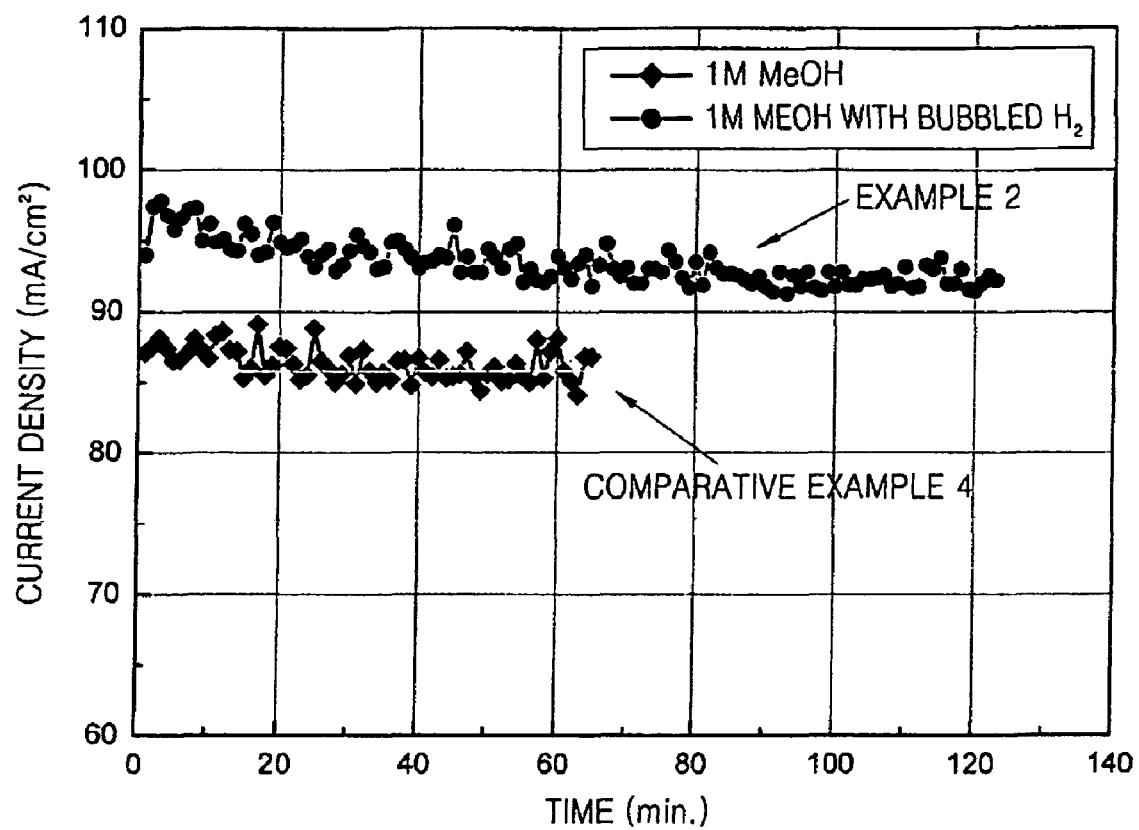
FIG. 2 is a graph of current density against time for fuel cells prepared according to Example 2 according to another embodiment of the present invention and Comparative Example 4.

FIG. 2 is a graph of current density against time for the fuel cells prepared according to Example 2 and Comparative Example 4. The performance of the fuel cells was measured at 50° C. while adding 1 M methanol and hydrogen gas or 1 M methanol and dry air.

Referring to FIG. 2, the fuel cell of Example 2 had a higher current density than the fuel cell of Comparative Example 1.

Also, cell potential against time of the fuel cells prepared according to Examples 1 through 4 and Comparative Examples 1 through 4 was measured. It was found that the performance of the fuel cells of Examples 1 and 2 was better than the performance of the fuel cells of Comparative Examples 1 and 2. The results are shown in FIGS. 1 and 2.

A fuel composition for a fuel cell according to aspects of the present invention includes hydrogen gas and a first fuel which generates protons and electrons. Accordingly, current density is high and catalyst activation is high. Using such a fuel composition, a fuel cell having excellent performance, such as efficiency, can be prepared.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel cell fuel, comprising:
    a liquid mixture of:
        a first fuel, which includes an aqueous solution having at least one of a C1-C10 alkyl alcohol and a C1-C10 alkyl acid; and
        hydrogen gas dissolved in the first fuel, wherein the amount of the hydrogen gas dissolved in the first fuel is in the range of 0.01 to 30 volume percent.

2. The fuel cell fuel of claim 1, wherein the aqueous solution includes methanol, ethanol, or formic acid.

3. The fuel cell fuel of claim 1, wherein the concentration of the C1-C10 alkyl alcohol or C1-C10 alkyl acid in the aqueous solution is in the range of 0.01 to 17 M.

4. A fuel cell, comprising:
a cathode;
an anode;
an electrolyte film; and
the fuel cell fuel of claim 1.

5. The fuel cell of claim 4 wherein the electrolyte film comprises a solid perfluorinated polymer membrane.

6. The fuel cell of claim 4 wherein the anode comprises an electron accepting catalyst disposed on the electrolyte film on the side toward the fuel cell fuel.

7. The fuel cell of claim 6 wherein the anode further comprises the electron accepting catalyst mixed with additional solid perfluorinated polymer membrane and disposed on the electrolyte film.

8. The fuel cell of claim 6 wherein the anode comprises the electron accepting catalyst coated on a fuel diffusion layer and disposed on the electrolyte film.

9. The fuel cell of claim 4 wherein the cathode comprises an electron donating catalyst disposed on the electrolyte film on the side opposite the fuel cell fuel.

10. The fuel cell of claim 9 wherein the cathode further comprises the electron donating catalyst mixed with additional solid perfluorinated polymer membrane and disposed on the electrolyte film.

11. The fuel cell of claim 9 wherein the cathode comprises the electron donating catalyst coated on a fuel diffusion layer and disposed on the electrolyte film.

12. A method of preparing a fuel cell fuel, the method comprising bubbling a hydrogen gas into a first fuel that includes an aqueous solution having at least one of a C1-C10 alkyl alcohol and a C1-C10 alkyl acid to obtain a liquid mixture of the first fuel and the hydrogen gas, wherein the hydrogen gas is dissolved in the first fuel, and wherein the amount of the hydrogen gas dissolved in the first fuel is in the range of 0.01 to 30 volume percent.

13. The method of claim 12, wherein the temperature while bubbling the hydrogen gas is in the range of −50 to 80° C.

14. The method of claim 12, wherein the pressure while bubbling the hydrogen gas is in the range of 0.1 to 20 atm.

15. The method of claim 12, wherein the bubbling rate of the hydrogen gas is in the range of 1 mL/min to 20 L/min.

16. A method of operating a fuel cell, the method comprising:
providing a fuel cell, the fuel cell having an anode, a cathode, and an electrolyte film between the anode and the cathode; and
supplying a fuel cell fuel to the anode of the fuel cell, wherein the fuel cell fuel includes a liquid mixture of:
a first fuel, which includes an aqueous solution having at least one of a C1-C10 alkyl alcohol and C1-C10 alkyl acid; and
hydrogen gas dissolved in the first fuel,
wherein the amount of the hydrogen gas dissolved in the first fuel is in the range of 0.01 to 30 volume percent.

* * * * *